US012683948B2

(12) United States Patent
Li et al.

(10) Patent No.: US 12,683,948 B2
(45) Date of Patent: *Jul. 14, 2026

(54) CRYPTOGRAPHIC BINDING OF NATIVE APPLICATION AND EXTERNAL BROWSER SESSIONS

(71) Applicant: Cisco Technology, Inc., San Jose, CA (US)

(72) Inventors: Danxiang Li, Arlington, MA (US); Vincent Parla, North Hampton, NH (US); Andrzej Kielbasinski, Grafton, MA (US); Dany Jacques Rochefort, Norfolk, MA (US)

(73) Assignee: Cisco Technology, Inc., San Jose, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/918,809

(22) Filed: Oct. 17, 2024

(65) Prior Publication Data

US 2025/0039164 A1     Jan. 30, 2025

Related U.S. Application Data

(63) Continuation of application No. 17/377,294, filed on Jul. 15, 2021, now Pat. No. 12,199,970.

(51) Int. Cl.
| | |
|---|---|
| *H04L 9/40* | (2022.01) |
| *G06F 21/60* | (2013.01) |
| *H04L 9/30* | (2006.01) |

(52) U.S. Cl.
CPC ........ *H04L 63/0815* (2013.01); *G06F 21/602* (2013.01); *H04L 9/3066* (2013.01); *H04L 63/0272* (2013.01); *H04L 63/166* (2013.01)

(58) Field of Classification Search
CPC .............. H04L 63/0815; H04L 9/3066; H04L 63/0272; H04L 63/166; G06F 21/602
See application file for complete search history.

(56) References Cited

U.S. PATENT DOCUMENTS

| | | | |
|---|---|---|---|
| 10,826,895 B1 | 11/2020 | Krut et al. | |
| 10,873,572 B1 | 12/2020 | Krishna | |
| 11,381,600 B1 * | 7/2022 | Wang .................... | H04L 63/168 |
| 2016/0119323 A1 | 4/2016 | Krishna | |
| 2017/0111351 A1 * | 4/2017 | Grajek .................. | H04L 63/083 |
| 2018/0152439 A1 | 5/2018 | Hande et al. | |
| 2019/0273730 A1 | 9/2019 | Yefimov et al. | |
| 2020/0007530 A1 * | 1/2020 | Mohamad Abdul ......................... H04W 12/084 |

* cited by examiner

*Primary Examiner* — Izunna Okeke

(74) *Attorney, Agent, or Firm* — Polsinelli P.C.

(57) ABSTRACT

Systems and methods are provided for receiving information associated with a final single sign-on page from a native browser, extracting a public key from the information associated with the final single sign-on page, generating a single sign-on token to bind a browser session and a native application session, associating the single sign-on token with the public key extracted from the information associated with the final single sign-on page, and encrypting the single sign-on token with the public key to bind the browser session and the native application session.

17 Claims, 9 Drawing Sheets

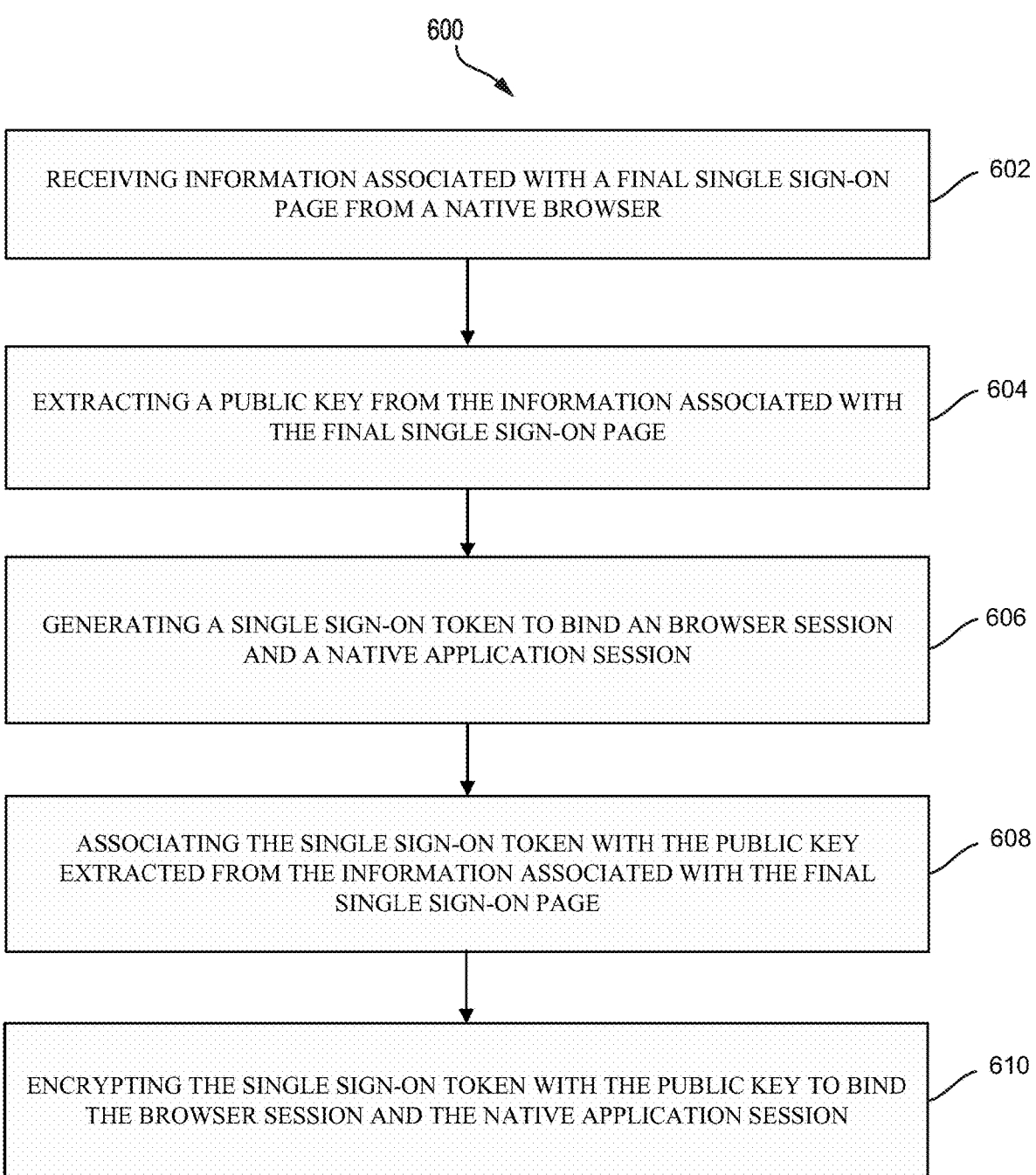

600

RECEIVING INFORMATION ASSOCIATED WITH A FINAL SINGLE SIGN-ON PAGE FROM A NATIVE BROWSER ⟋ 602

EXTRACTING A PUBLIC KEY FROM THE INFORMATION ASSOCIATED WITH THE FINAL SINGLE SIGN-ON PAGE ⟋ 604

GENERATING A SINGLE SIGN-ON TOKEN TO BIND AN BROWSER SESSION AND A NATIVE APPLICATION SESSION ⟋ 606

ASSOCIATING THE SINGLE SIGN-ON TOKEN WITH THE PUBLIC KEY EXTRACTED FROM THE INFORMATION ASSOCIATED WITH THE FINAL SINGLE SIGN-ON PAGE ⟋ 608

ENCRYPTING THE SINGLE SIGN-ON TOKEN WITH THE PUBLIC KEY TO BIND THE BROWSER SESSION AND THE NATIVE APPLICATION SESSION ⟋ 610

CRYPTOGRAPHIC BINDING OF NATIVE APPLICATION AND EXTERNAL BROWSER SESSIONS

CROSS-REFERENCE TO RELATED APPLICATION

This application is a continuation of U.S. patent application Ser. No. 17/377,294 filed on Jul. 15, 2021, entitled, "CRYPTOGRAPHIC BINDING OF NATIVE APPLICA-TION AND EXTERNAL BROWSER SESSIONS", the contents of which is incorporated by reference in its entirety.

TECHNICAL FIELD

The subject matter of this disclosure relates in general to the field of computer networking and, more particularly, to establishing a cryptographic binding between an external browser session and a native application session.

BACKGROUND

Single sign-on (SSO) is most commonly associated with web applications that share a session within a browser. However, organizations that deploy SSO may also need to use SSO for native applications running outside of the browser. This allows for session sharing between the two environments to maximize the benefits of SSO.

BRIEF DESCRIPTION OF THE FIGURES

To provide a more complete understanding of the present disclosure and features and advantages thereof, reference is made to the following description, taken in conjunction with the accompanying drawings, in which:

FIG. 6 illustrates an example process for establishing a cryptographic binding between an external browser session and a native application session, in accordance with some embodiments;

DESCRIPTION OF EXAMPLE EMBODIMENTS

Figure 1:
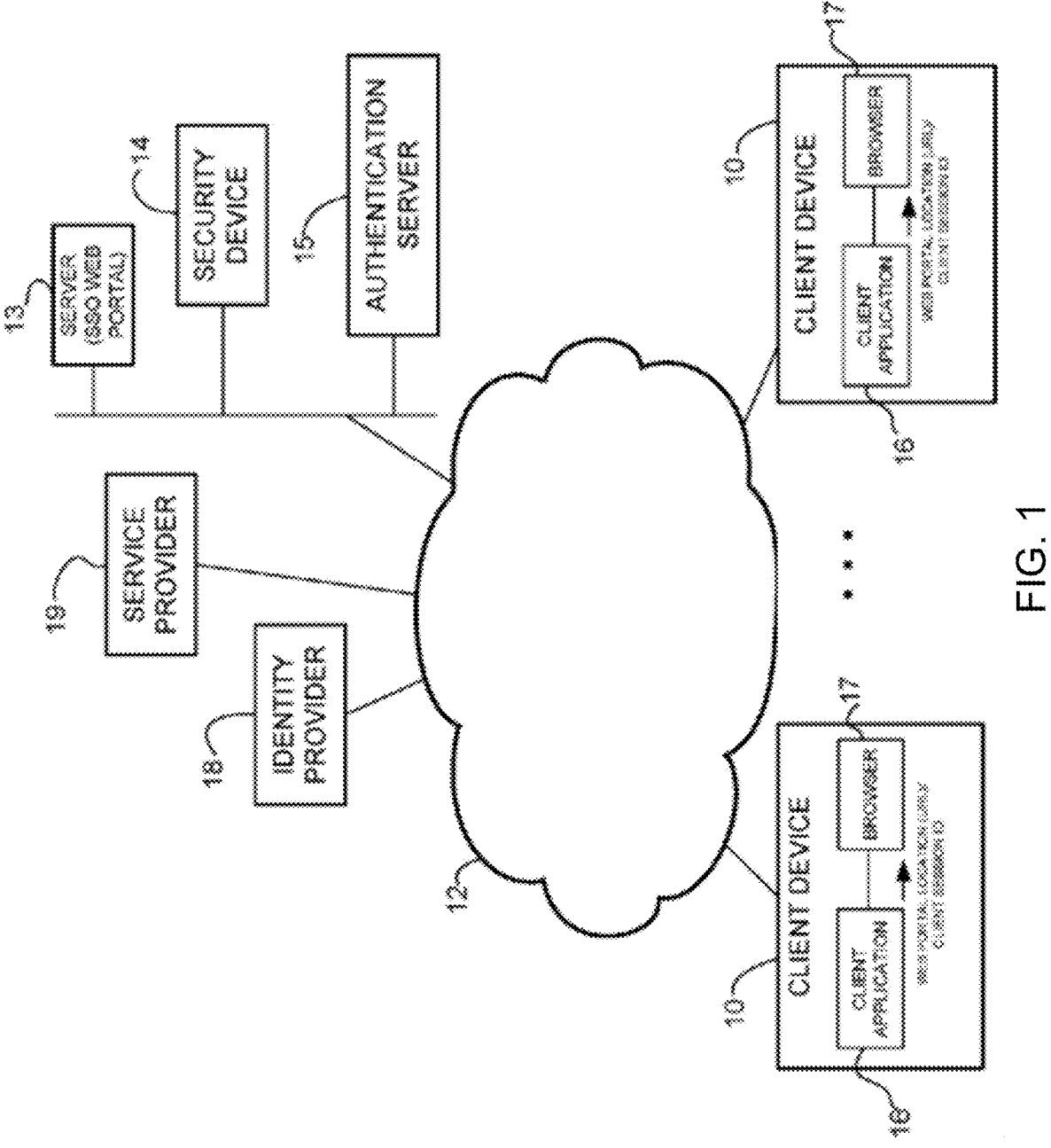
FIG. 1 illustrates an example network environment, in accordance with an embodiment of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods for establishing a cryptographic binding between a browser session and a native application session. For example, systems and methods are provided for receiving, at a server, information associated with a final single sign-on page from a native browser, extracting, by the server, a public key from the information associated with the final single sign-on page, generating, by the server, a single sign-on token to bind a browser session and a native application session, associating, by the server, the single sign-on token with the public key extracted from the information associated with the final single sign-on page, and encrypting, by the server, the single sign-on token with the public key to bind the browser session and the native application session.

EXAMPLE EMBODIMENTS

Single Sign-On (SSO) technology allows end users to apply their existing secure credentials and get authenticated once to gain access to those applications to which the end user has been approved access. SSO authentication removes the complexity of offering clients access to disparate applications across the network and replaces this with a single point of access to the applications. SSO also helps organizations enforce unified authentication for secure access to multiple applications and services, thus improving overall security. However, even with the advent of SSO, there are still many applications in which users need to login more than once. For example, applications utilizing embedded browsers may still require additional authentication.

The embodiments described herein allow client applications to use web browsers to perform SSO authentication so that end users only need to log in once. The embodiments may be used to extend web based SSO/SLO to standalone client applications (desktop applications, mobile applications) so that the client applications can work with web browser based applications seamlessly. For example, the end user may log in once for a VPN (Virtual Private Network) and then automatically be granted access for other applications that support SSO without further logins. One or more embodiments can eliminate the need to send information from the web browser to the client application, thus eliminating the need for installation of ActiveX control, Java applet, browser based plugins, or a local web socket. Other embodiments can include the web browser providing information (e.g., an encrypted token) to a client application by utilizing a local web request or a custom application URI. Since the embodiments do not rely on these components, there is no additional effort needed to support different types of operating systems and web browsers and security risks introduced by these additional components is avoided. In certain embodiments, a web browser that is widely supported by different platforms, including for example, Windows, MAC OS X, and Linux may be used to forward a single login request for SSO authentication.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, fire- walls, controllers, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network).

The network shown in the example of FIG. 1 includes a plurality of client devices (users, hosts, endpoints) 10 in communication with a security device 14 and an authenti- cation server 15 (e.g., Authentication, Authorization, and Accounting (AAA) server) via a network 12 (e.g., public network, Internet). The network 12 is also in communication with one or more identity providers 18 or service providers 19 comprising one or more service applications. An authen- tication function may be performed at any of the network devices (e.g., security device 14, authentication server 15, identity provider 18). The security device 14, authentication server 15, identity provider 18, and service provider 19, or any combination thereof may be located at the same network (e.g., enterprise or other private network) or at one or more different networks or in a cloud.

The identity provider (IdP) 18 may be responsible for issuing identification information for network devices want- ing to interact with the service provider 19 and for the actual authentication of users. For example, the identity provider 18 may support various authentication mechanisms, includ- ing user/password based authentication for LDAP (Light- weight Directory Access Protocol), Kerberos authentication, SmartCard based authentication, and others. The identity provider 18 may support a variety of protocols, including for example, SAML (Security Assertion Markup Language), which is an WL-based open standard data format that may be used to exchange authentication and authorization data between the identity provider and the service provider 19. The identity provider 18 and service provider 19 may operate at one or more servers in communication with network 12. The functions of one or more of the identity provider 18 and service provider 19 may also be embodied by processes running in a data center in a cloud computing environment, for example.

The security device 14 may comprise any appliance (e.g., Cisco ASA (Adaptive Security Appliance), server (e.g., VPN server), network element, or general purpose computing device, which may be located in a network or in a cloud or fog environment. The security device 14 may be in com- munication with authentication server 15 or co-located at the same network device as the authentication server. The security device 14 may, for example, validate user creden- tials with the authentication server 15. The security device 14 may also include or be in communication with a web or VPN server (e.g., SSO web portal 13). As described below, the security device 14 is operable to provide to the client 10 an HTTP (Hypertext Transfer Protocol) service and authen- tication service at the security device or at another device (e.g., authentication server, identity provider) via redirec- tion.

The client device 10 may comprise, for example, a desktop computer, laptop computer, mobile phone, tablet, personal digital assistant, or any other device operable to communicate with network 12. The client device 10 may be a managed or unmanaged device. For example, a user may attempt to access a network from a corporate-managed personal computer, personal network-accessible device, or public terminal. The client device 10 may be a wired device or wireless device, or configured for both wired communi- cation (e.g., connected to a docking station) and wireless communication. The client device 10 may be in communi- cation with any number of networks (e.g., Internet, VPN (Virtual Private Network), enterprise, corporate network, data center, and the like).

As shown in FIG. 1, the client device 10 may include a client application (standalone application, desktop applica- tion, mobile application, client, agent) 16 and a browser (web application, web browser, default browser) 17. In one embodiment, the client application 16 comprises a security mobility client (e.g., Cisco AnyConnect), VPN client, or other client or agent. The term "client application" as used herein may refer to any application or software (e.g., client, agent, application, mobile application, desktop application, or module) operable to run on any client device (e.g., mobile device, computer (laptop, desktop), wired or wireless device) and interact with a browser installed at the client device.

The client application 16 may be configured, for example, to support SAML (Security Assertion Markup Language) or other similar language or protocol so that users only need to perform a web based SSO once for a client session (e.g., VPN session) and all SAML supported web applications. An SAML SSO assertion may be linked with a client session used in the SSO authentication process. As described in detail below, the embodiments leverage the browser 17 on the client device 10 to integrate SSO with the client based session. The client application 16 is operable to launch the browser 17 using security information (e.g., session key) obtained from the security device 14 for use in an SSO authentication process.

The browser 17 may comprise any type of application installed at the client device 10 and operable to retrieve or transmit information on the World Wide Web (web). Examples of browsers include Google Chrome, Mozilla Firefox, Microsoft Edge and Internet Explorer, Opera, and Apple Safari. Other browser applications may also be used. As shown in FIG. 1, the browser 17 is separate (distinct, independent) from the client application 16 (i.e., not embed- ded within the client application). As described below, the authentication session is performed via the browser 17 rather than directly between the client application 16 and security device 14. In certain embodiments, the browser 17 may include a clientless VPN or other web browser based appli- cation that may be used to setup a VPN channel. As noted above, the embodiments do not rely on any browser plugins/ add-ons, Java applets, Active X controls, or other third party applications. Since the default browser 17 is used for the SSO/SLO process, there is no need for the client application 16 to include a built-in browser.

As shown in the example of FIG. 1, the security device 14 is in communication with a server comprising a web portal 13 for use in SSO authentication. The web portal may also be located at the security device 14, identity provider 18, service provider 19, or other network device. During the authentication process, the security device 14 may provide the client device 10 a location of the web portal (e.g., URL (Uniform Resource Locator)). The URL is returned to the client application 16 upon initiation of a login request by the client application. The client application 16 forwards the URL along with a session identifier (ID) to the browser 17, for use by the browser in performing the SSO authentication through the web portal with the session ID. The URL may be, for example, the URL of a single sign-on service that an enterprise is using. The session identifier may be created from a client application channel, which may be protected by conventional security means. Upon receiving the URL and session ID, the client application 16 may generate a request (e.g., HTTP GET request) for the web browser 17. A web browser session is used to check the existing session between the client application 16 and security device 14. If the session ID is not valid, the web server returns an error message. Thus, if users attack the web server using fake session IDs, the server may block the client.

The HTTP request may be used to redirect the client 10 to the web portal 13 (e.g., clientless portal, web server, VPN server) that initiates the SSO process. For example, the browser 17 may transmit the HTTP GET with the authentication request to the identity provider 18. The identity provider 18 may respond to the HTTP GET with a user login form. User provided credentials may be inserted into the login form and the credentials sent by the browser application 17 to the identity provider 18. During the authentication process, a channel between the client application 16 and security device 14 may remain open. Once authentication is complete, the client 16 may be notified of the results of the authentication via this channel.

It is to be understood that the network devices and topology shown in FIG. 1 and described above is only an example and the embodiments described herein may be implemented in networks comprising different network topologies or network devices, or using different protocols or languages, without departing from the scope of the embodiments. For example, any of the components or functions of the security device 14, authentication server 15, web portal 13, identity provider 18, and service provider 19 may be co-located or distributed among any number of network devices located in one or more networks or cloud. The network may include any number or type of network devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, accelerators, virtual machines, switches, routers, appliances, controllers, or other nodes interconnected to form a large and complex network, which may include cloud or fog computing. Nodes may be coupled to other nodes through one or more interfaces employing any suitable wired or wireless connection, which provides a viable pathway for electronic communications.

As provided above, single sign-on (SSO) is most commonly associated with web applications that share a session within an external browser. However, organizations that deploy single sign-on may also need to use single sign-on for native applications running outside of the external browser. This allows for session sharing between the two environments to maximize the benefits of single sign-on.

To accomplish this, native applications can leverage the external browser for implementing single sign-on. However, this requires a secure mechanism to bridge the external browser session with the native application's own authentication session. This is especially challenging because the external browser executes out of process with normal user privileges. Raw tokens that are passed from the external browser to the native application will be vulnerable to session hijacking attacks by a malicious actor.

A browser session can be associated with a native application session based on an interprocess communication (IPC) mechanism from the external browser to a native application, e.g., by an asynchronous HTTP request or custom URI. These mechanisms can be triggered by Javascript code executing within the external browser. An authentication token is typically used as a secret to transfer the session after the browser has been authenticated to a service provider (e.g., through the identity provider ("IDP")). However, this technique does not address the security concerns that surround this type of communication, which is especially problematic because external browsers execute with unprivileged user permissions. Without protection, interception of this communication by a malicious actor will result in session hijacking attacks.

As such, a need exists for securing single sign-on interactions between native applications and external browsers to prevent session hijacking. As described herein, embodiments can include processes for establishing a cryptographic binding between a native application and an external browser sessions for the purpose of single sign-on. Embodiments can include enabling session sharing between the two components in a way that is secure against session hijacking attack by a malicious actor who can intercept IPC communications. In some implementations, embodiments of the present disclosure can include being implemented by Any-Connect, Firepower Threat Defense (FTD), and Adaptive Security Appliance (ASA) for Security Assertion Markup Language (SAML) that involve external browsers.

In other implementations, the present disclosure can allow native applications to securely implement single-sign on using external browsers, e.g., by establishing a cryptographic binding between the external browser session and the native application session. In other examples, the present disclosure can include implementing local browser single sign-on such as enabling single sign-on with a user's local browser and WebAuthn Support (e.g., courtesy of the local browser).

Figure 2:
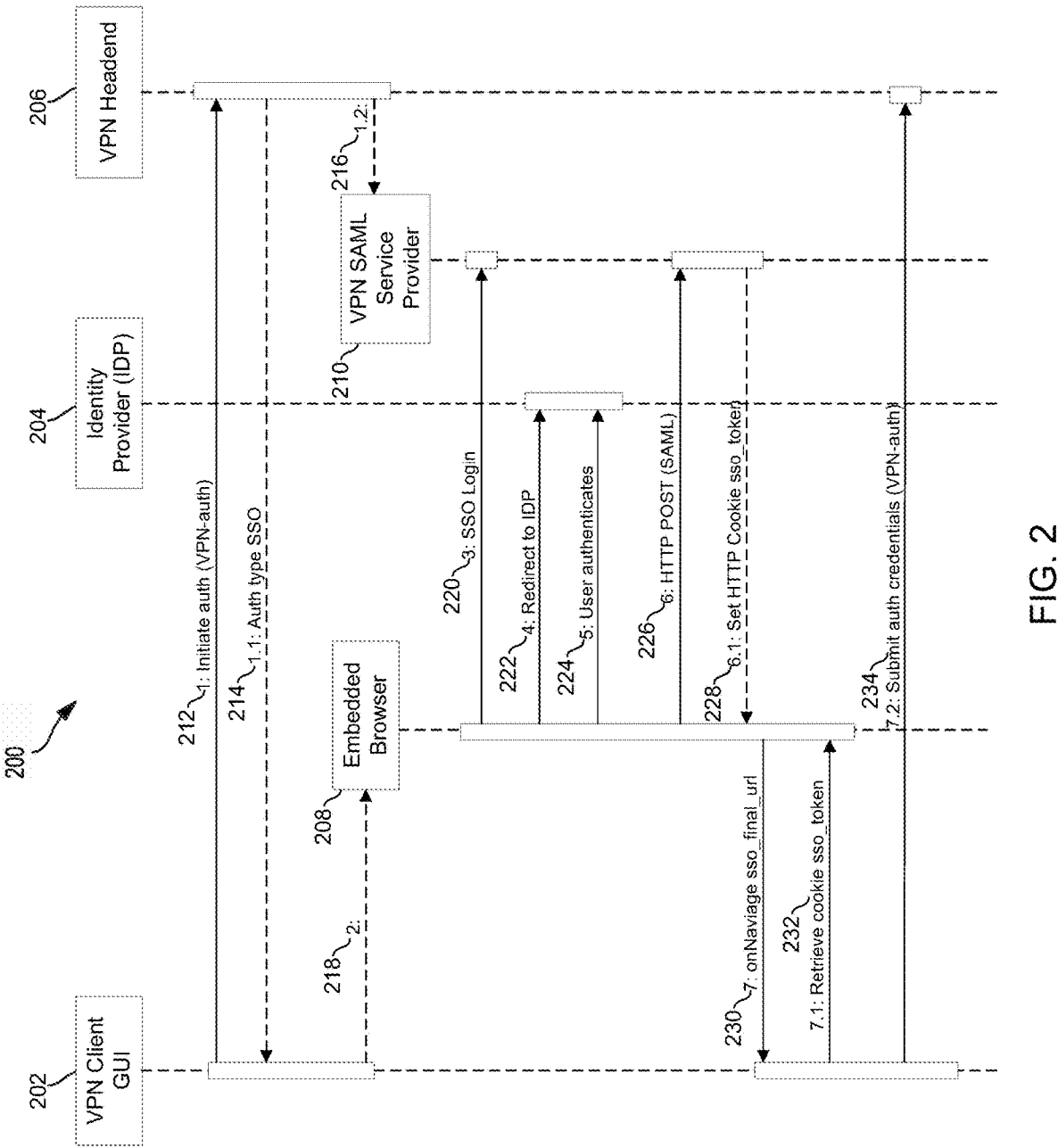
FIG. 2 illustrates an example process for implementing embedded single sign-on, in accordance with an embodiment of the present disclosure.

FIG. 2 illustrates an example process for implementing embedded single sign-on 200, in accordance with an embodiment of the present disclosure. In some implementations, the process 200 can include utilizing a VPN Client GUI 202 (e.g., an AnyConnect GUI), an identity provider ("IDP") 204, a VPN headend 206, an embedded browser 208, and a VPN Security Assertion Markup Language (SAML) service provider 210.

Difference from an Embedded Browser SSO:

The process 200 can include an operation that utilizes embedded single sign-on (SSO). For example, at step 212, the process 200 can include initiating VPN authentication (e.g., using a VPN authentication ("VPN-auth") protocol) from the VPN Client GUI 202 to the VPN headend 206.

At step 214, the process 200 can include the VPN headend 206 responding with an indication of SSO authentication, which can include providing a login URL, a final login page, and a name of a final login cookie that holds an SSO token.

At step 216, the process 200 can include the VPN SAML service provider 210 receiving an SAML login URL from the VPN headend 206.

At step 218, the process can include the VPN Client GUI 202 generating an embedded web view control (e.g., the embedded browser 208) and open a login page. The embedded browser 208 can then listen for navigation events from the web view.

At step 220, the process 200 can include the embedded browser 208 providing SSO login information to the VPN SAML service provider 210.

At steps 222, 224, the process 200 can include redirecting the user to the IDP 204 and authenticating the user.

At step 226, once the user has been authenticated by the IDP 204 in the embedded web browser at step 224, the process 200 can include redirecting the user back to the VPN SAML service provider page 210.

At step 228, the process 200 can include the VPN Client GUI 202 (e.g., via the embedded browser 208) extracting an SSO_TOKEN cookie and submitting the SSO_TOKEN cookie as the VPN authentication credential to the VPN headend 206 at step 234 of the process 200.

At step 230, as the VPN Client GUI 202 can control the embedded browser 208, the process 200 can include the VPN Client GUI 202 receiving navigation events and accessing a cookie store to retrieve the final SSO_TOKEN, step 232 of the process 200.

In some examples, the process 200 may not be used when utilizing a native browser that runs as an independent external process. In such examples, the process 200 can include utilizing interprocess communication (IPC) that can securely deliver the SSO_TOKEN to the VPN Client GUI 202.

In other implementations, the IPC mechanism utilized by the process 200 can vary based on the platform. The VPN SAML service provider page 210 can further include utilizing Javascript code. The Javascript code can include instructions to obtain the SSO_TOKEN (e.g., either from a cookie or be embedded in the Javascript code) and deliver the SSO_TOKEN to the VPN Client GUI 202. The VPN Client GUI 202 can further be configured to include the following functionalities, depending on the operating system and type of browser:

1. Generating an XMLHttpRequest for a local HTTP/HTTPS webserver hosted within the VPN Client GUI 202.

2. Open a custom URI (e.g., VPN://).

The above-mentioned mechanisms can be utilized by the process 200 for providing the SSO_TOKEN back to the VPN Client GUI 202 (e.g., step 228 of the process 200), which are consistent with "Private-Use URI Scheme Redirection" and "Loopback Interface Redirection," also described in RFC 8252 (Oauth 2.0 for Native Applications). Another mechanism that can be utilized by the process 200 can include using Chrome's native messaging framework.

Special Headend Package for Native Browser SSO:

In some implementations, for an embedded browser SSO, the final service provider page (e.g., VPN SAML service provider 210) can be a static HTML page. The SSO_TOKEN can also be delivered to the VPN Client GUI 202 via a browser cookie store. In other implementations, for native browser SSO, the native browser SSO may require more complexity in the final service provider page 210 to deliver the SSO_TOKEN, out of process, to the VPN Client GUI 202. The final service provider page 210 can then execute Javascript code to detect the running browser and platform, and then attempt an IPC with the VPN Client GUI 202.

Moreover, the final service provider page 210 may continuously change and can be updated independently of underlying headend image. In some implementations, a new type of headend package can be utilized that can contain the final service provider page 210 for a native browser SSO. When the VPN headend 206 serves the final SSO service provider page 210, the VPN headend 206 can pull the Javascript code from the headend package. For example, the native browser SSO package may or may not be common to all endpoint platforms. In addition, the native browser SSO package can be signed. At install time, the VPN headend 206 can verify that the native browser SSO package is signed and that the native browser SSO package has not been tampered with.

Figure 3:
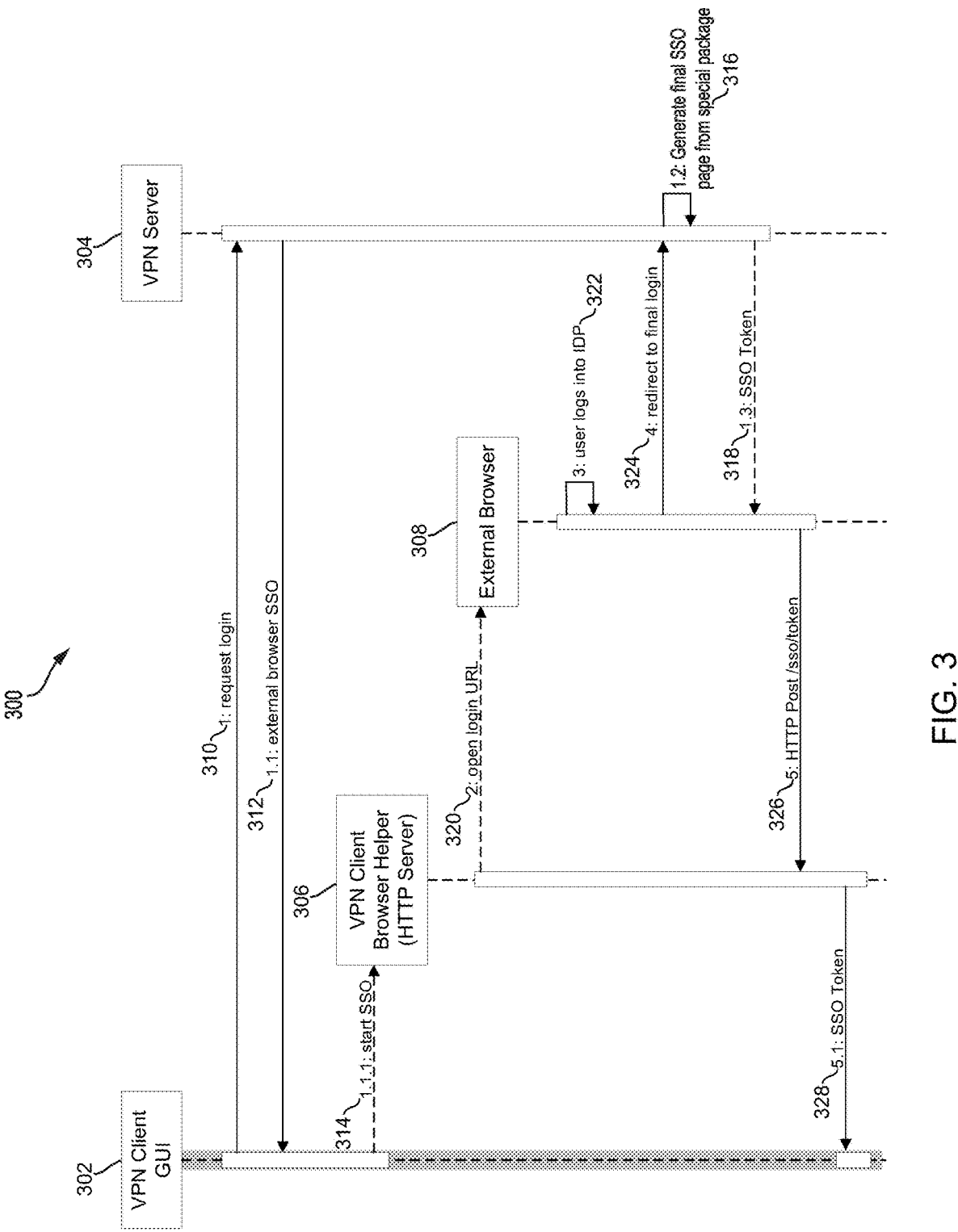
FIG. 3 illustrates an example process for implementing native browser single sign-on, in accordance with some embodiments.

FIG. 3 illustrates an example process for implementing native browser single sign-on 300, in accordance with some embodiments. In some implementations, the process 300 can include utilizing a VPN Client GUI 302 (e.g., an AnyConnect GUI), a VPN Server 304 (e.g., VPN headend), a VPN Client Browser Helper (e.g., HTTP server) 306, and an external browser 308.

Native Browser SSO Sample Flow:

Referring to FIG. 3, the process 300 can include utilizing a native browser SSO along with a desktop platform. At step 310, the process 300 can include initiating VPN authentication between the VPN Client GUI 302 and the VPN Server 304.

At step 312, after initiating the VPN authentication at step 310, the process 300 can include the headend (e.g., VPN Server 304) indicating an SSO authentication (e.g., similar to an embedded browser counterpart). The process 300 can further include utilizing additional parameters that can indicate whether a native browser should be used.

At step 314, the process 300 can include the VPN Client 302 initiating a user's native browser with the initial SSO login URI. In some implementations, on desktop platforms, the VPN Client 302 can utilize an internal utility (e.g., the Browser Helper 306), which can also run an HTTP/HTTPS server on a localhost.

At step 320, the process 300 can include opening a login URL with the external browser 308.

At step 322, the process 300 can include authenticating the user with an identity provider ("IDP") and log into the IDP.

At step 324, the process 300 can include redirecting the user to a headend service provider's final login page (e.g., VPN Server 304). The headend service provider's final login page can then execute Javascript code that delivers a SSO token to the VPN Client GUI 302, at step 318 of the process 300.

At steps 326, 328, the process 300 can include the VPN Server 304 providing the SSO token by utilizing an VPN-auth protocol as the VPN authentication credential.

At step 316, the process 300 can include generating a final SSO page from a special package, as described herein.

Figures 4A, 4B:
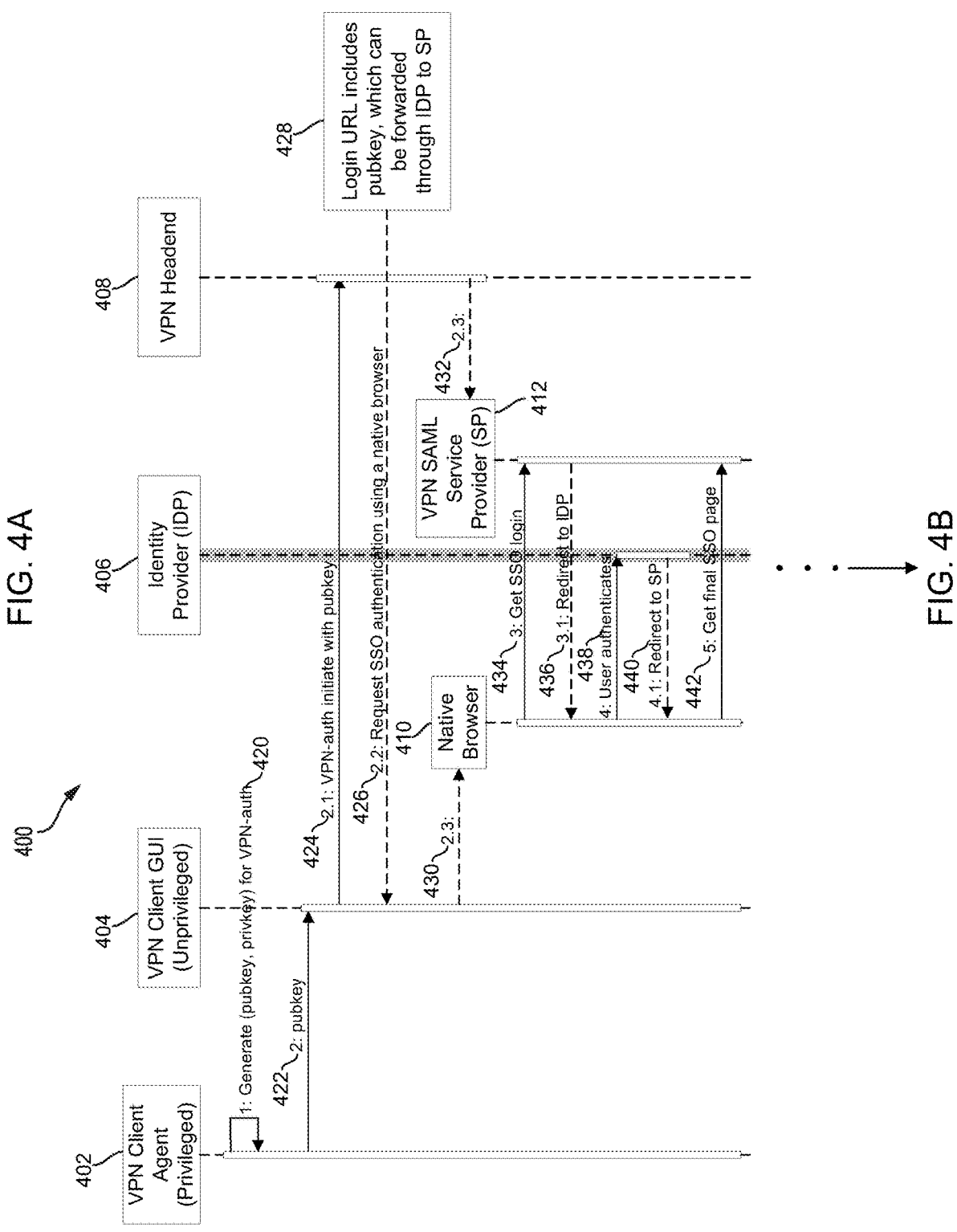
FIGS. 4A and 4B illustrate an example process for protecting a single sign-on token and tying a browser native session with an authentication session, in accordance with some embodiments.
Figures 4A, 4B:
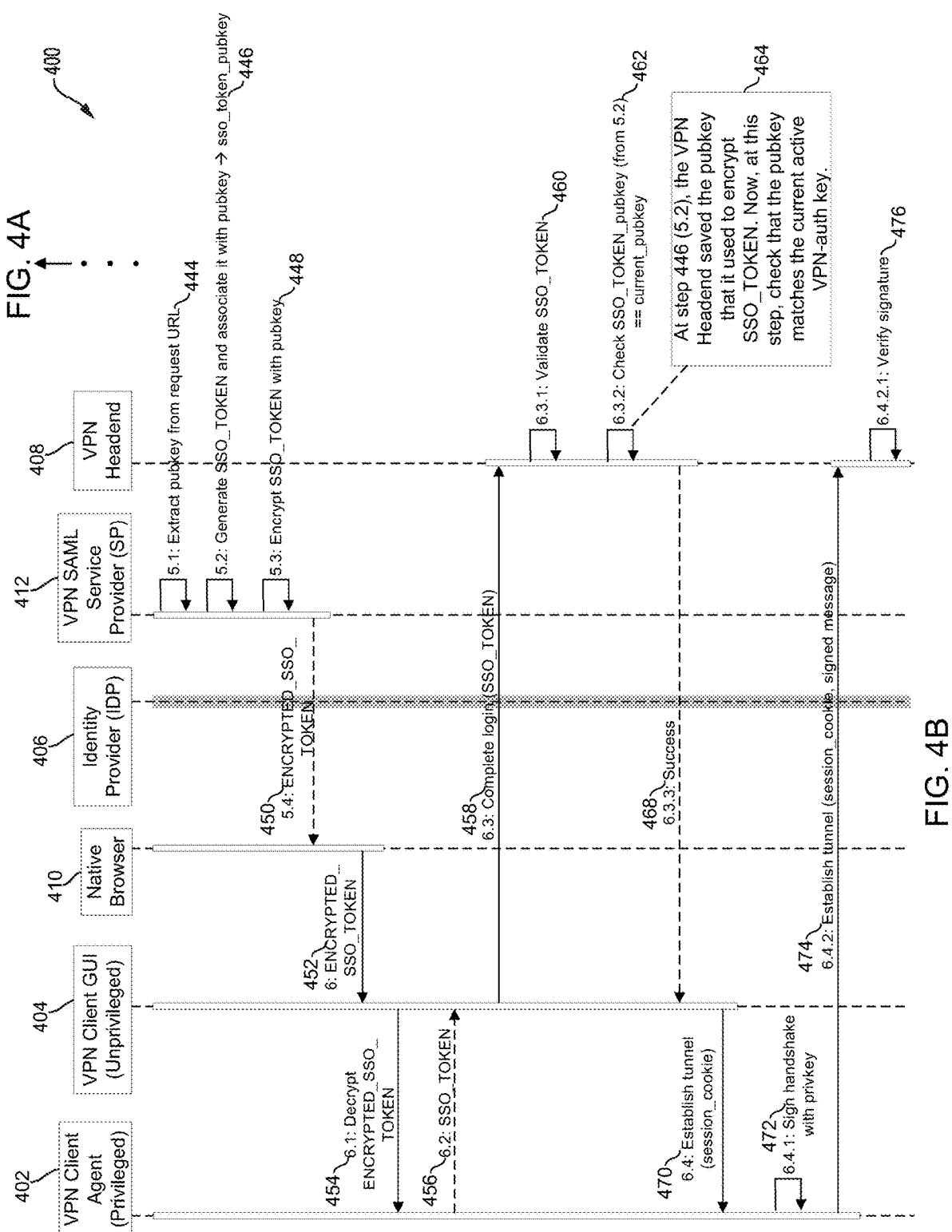

FIGS. 4A and 4B illustrate an example process for protecting a single sign-on token and tying a browser native session with an authentication session 400, in accordance with some embodiments. The process 400 can include utilizing a VPN Client Agent 402 (e.g., being privileged), a VPN Client GUI 404 (e.g., being unprivileged), an identity provider ("IDP") 406, a VPN headend 408, a native browser 410, and a VPN Security Assertion Markup Language (SAML) service provider 412. In some examples, the VPN Client Agent 402 can be an AnyConnect Agent and the VPN Client GUI 404 can be an AnyConnect GUI. In some implementations, the VPN Client Agent 402, the VPN Client GUI 404, the IDP 406, the VPN headend 408, the native browser 410, and the VPN SAML service provider 412 can interact with one another to facilitate the process 400, as described herein.

An AnyConnect (AC) of the process 400 can be an endpoint VPN client of a user. Moreover, FIGS. 4A and 4B illustrate two VPN Client components (e.g., the VPN Client Agent 402 and the VPN Client GUI 404), but the VPN Client components can be configured as a single native application. In some examples, the VPN headend 408 can be a server for a native application, while the VPN SAML service provider 412 can be a separate server that acts as a service provider in an SAML flow. The VPN headend 408 and the VPN SAML service provider 412 can also be communicatively coupled to exchange information between the two servers.

At step 420, the process 400 can include a native application generating an asymmetric key pair including a public key (e.g., a binding_pubkey) and a private key (e.g., a binding_privkey), which can be utilized for cryptographically secure device binding. In some implementations, the VPN Client Agent 402 can utilize VPN authentication (e.g., using an VPN-auth protocol), as described herein. In some examples, the pubkey can then be bound to an VPN-auth session. In other implementations, the private key can reside within privileged memory space or a Secure Enclave of the VPN Client Agent 402. In some examples, the asymmetric key pair can also be an encryption ("EC") key pair.

At step 422, the process 400 can include providing the public key (e.g., pubkey) to the VPN Client GUI 404.

At step 424, the process 400 can include the VPN Client GUI 404 providing the public key to the VPN headend 408 as part of a native application protocol exchange. The VPN headend 408 can associate the public key with a current transport layer security (TLS) session with a native application.

At step 426, the process 400 can include the VPN Client GUI 404 receiving a request from the VPN headend 408 for SSO authentication using a native browser.

At steps 430, 432, the process 400 can include the native application initiating the external browser 410 with a URL to the VPN SAML service provider 412. The URL can embed the public key from step 420 of the process 400 as a pass-through parameter through the SAML flow, as described herein. At box 428, a login URL can include the public key (e.g., pubkey), which can be forwarded from the IDP 406 to the VPN SAML service provider 412. In other implementations, the VPN headend 408 can insert the pubkey as a pass-through parameter in the SSO login URL. After user has been authenticated, the VPN headend service provider 412 can then obtain the pubkey from the requested URL.

At steps 434, 436, 438, 440, 442, the process 400 can include the user completing a SAML flow with the native browser 410. For example, at step 434, the process 400 can include receiving an SSO login at the VPN SAML service provider 412.

At step 436, the process 400 can include the VPN SAML service provider 412 redirecting the user to the IDP 406.

At step 438, the process 400 can include the IDP 406 authenticating the user.

At step 440, the process 400 can include the IDP 406 redirecting the user to the VPN SAML service provider 412.

At step 442, the process 400 can include the native browser 410 providing a final SSO page to the VPN SAML service provider 412. After authenticating the user with the IDP 406 (e.g., step 438 of the process 400), the user can be redirected to the VPN SAML service provider 412 (e.g., step 440 of the process 400) along with an SAML assertion.

At step 444, in addition to checking the SAML assertion, the process 400 can include the VPN SAML service provider 412 extracting the public key from a request URL or an HTTP cookie. The public key can also be extracted from session data between the native browser 410 and the VPN SAML service provider 412. For example, the session data can include backend datastore indexes based on an identifier, which may be stored in an URL or a cookie.

At step 446, the process 400 can further include generating an SAML authentication token (e.g., an SSO token) and associating the SAML authentication token with the public key. In some implementations, the SAML authentication token can be a one-time or multiple use authentication token. Step 446 of the process 400 can further securely bind an authenticated browser TLS session with the native application's TLS session. This binding can be achieved by the server (e.g., the VPN headend 408 or the VPN SAML server provider 412) associating the SAML authentication token (e.g., an SSO token) with the public key. When the native application subsequently submits the SSO token, the native application may have to prove that it has ownership of the corresponding private key. In some examples, additional metadata relating to the client can be bound such as an IP address of a requester.

At step 448, as an additional security step, the process 400 can include the VPN SAML service provider 412 encrypting the SAML authentication token with the public key (e.g., pubkey) before returning the encrypted SAML authentication token back to the native browser 410, at steps 450, 452 of the process 400.

At step 450, the process 400 can utilize the encrypted SAML authentication token and additional metadata (other than the encrypted SAML authentication token) that can be sent to the client, which can allow the client to decrypt the data by exercising its private key (e.g., privkey). The additional metadata can include information that can be utilized by the native application (e.g., the native browser 410) to derive the shared secret keys that may be necessary to decrypt the SAML authentication token (e.g., SSO token) with optional integrity checking, which may depend on a specific cipher suite. In some implementations, the process 400 can include utilizing the cipher suite, which may include an initialization vector, AES-GCM tag, ephemeral public key, etc. With the EC key, the process 400 can utilize an encryption scheme including Elliptic Curve Diffie-Hellman (ECDH), Elliptic Curve Integrated Encryption Scheme (ECIES), Hybrid Public Key Encryption (HPKE), or any other encryption scheme suitable for the intended purpose and understood by a person of ordinary skill in the art. In some examples, an alternative to utilizing EC keys, the process 400 can utilize Rivest-Shamir-Adleman (RSA) keys similar to the EC keys. In this example, the public key can be an RSA public key, which can be used to directly encrypt the SSO token.

At step 452, the process 400 can include the native browser 410 delivering the encrypted SAML authentication token back to the native application (e.g., the VPN Client GUI 404).

At step 454, the process 400 can include the native application (e.g., the VPN Client Agent 402) decrypting the encrypted SAML authentication token by using a local private key (e.g., privkey).

At steps 456, 458, the process 400 can include providing the SAML authentication token back to the VPN headend 408, which can determine whether the SAML authentication token is valid, step 460 of the process 400.

At step 462, the process 400 can include the VPN headend 408 determining whether the public key that is associated with the SAML authentication token (provided in step 426) matches that of the current native application session. At box 464 of FIGS. 4A and 4B, the VPN Server (e.g., the VPN headend 408) saved the public key from step 446 of the process 400 that can then be used to encrypt the SSO_TO- KEN. At step 462, the process 400 can further include determining that the public key matches the current active VPN-auth key.

As steps 468, 470, 472, 474, 476, the process 400 can include completing the verification process by requesting the native application to prove that it has possession of the corresponding private key by signing a message in a TLS handshake. Completion of the verification process can include establishing a tunnel based on a session_cookie (e.g., step 470 of the process 400), signing a handshake with the private key (e.g., privkey) (step 472 of the process 400), establishing a tunnel based on the session_cookie and the signed message (e.g., step 474 of the process 400), and verifying the signature (e.g., step 476 of the process). In some implementations, when the VPN headend 408 validates the SSO_TOKEN, the VPN headend 408 can also determine that the associated SSO public key matches the key for the current VPN-auth session. Proof of possession of the key can then be asserted when VPN agent (e.g., the VPN Client Agent 402) establishes the VPN tunnel as part of the existing flow. The VPN headend 408 can also request the client to sign a TLS handshake message with the private key.

Security of the SSO Token:

As the SSO token can enable its possessor to authenticate with a VPN headend 408, the delivery of the SSO token via an IPC (e.g., between the native browser 410 and the VPN Client 402, 404) can provide additional security considerations. The process 400 can include utilizing other protection methods such as:

1. The VPN headend 408 can associate the SSO token with a corresponding VPN authentication (e.g., VPN-auth) session or transport. For example, the VPN headend 408 can associate the SSO token with an VPN-auth TLS session ID. This implementation can ensure that even if an attacker intercepts the SSO token, the SSO token cannot be replayed.

2. Before the authentication process begins, the VPN Client 402, 404 can generate an asymmetric key pair, as described herein. When the VPN Client 402, 404 begins the VPN authentication process 400, the VPN Client 402, 404 can provide a public key to the VPN headend 408. Once a user has finished the authenticating process, the VPN headend 408 can encrypt the SSO token using the public key before sending the SSO token back to the VPN Client 402, 404.

In some implementations, the process 400 can include protecting the SSO token and tying the browser native session with the VPN Client's 402, 404 VPN-auth session. For example, the process 400 can utilize the VPN Client 402, 404 authentication mechanism, which can protect VPN Client's 402, 404 session cookie.

The process 400 can further address the following security concerns:

1. An attacker cannot trick a victim into remotely logging in for the attacker (e.g., Attack #1 as described below). This can be facilitated as the SSO_TOKEN may be required to complete the authentication process, which may only be available on the victim's machine.

2. Even if the SSO_TOKEN is intercepted from the browser, is not easily replayable because the SSO_TOKEN can be encrypted using a private key owned by VPN agent.

3. Even if an attacker is able to access the VPN agent to decrypt the SSO_TOKEN, the attacker still cannot use the SSO_TOKEN on their own machine to establish a VPN tunnel. This can be facilitated by the process 400 as the SSO_TOKEN can be bound to the VPN-AUTH key at the VPN headend 408. This assertion can be enforced by the VPN headend 408 at step 462 of the process 400. In other implementations, the authentication process 400 can be handled by the VPN Agent (e.g., VPN Client Agent 402), which can be further mitigated.

4. In the scenario where an attacker tampers with the victim's login URL and replaces the pubkey with their own pubkey (e.g., initiated from another machine), the attacker may be able to login as the victim if the attacker is somehow able to also retrieve the ENCRYPTED_SSO_TOKEN (e.g., Attack #3 as described below).

In a "man-in-the-middle" (MITM) scenario, the attacker may have full control of the SSO login URL. In such a scenario, it may be important that an attacker is not able to modify the SSO login URL in a way that allows them to receive or intercept the ENCRYPTED_SSO_TOKEN from the real VPN headend 408.

To combat the above-mentioned security concerns, at step 460, the process 400 can include the VPN headend 408 deleting the SSO_TOKEN as soon as the SSO_TOKEN "matches." This approach can combat replay attacks.

Security Considerations:

Other security concerns of possible attacks on an external SSO implementation can include:

1—Phishing attack (e.g., a known vulnerability with SSOv1) that requires a victim to login to a phishing link:

1. Attacker initiates an SSO request on their machine.

2. Attacker launches a phishing attack and has a victim authenticate an attacker's link on the victim's machine.

3. Attacker can then login from their machine.

2—A token replay attack from a different machine that requires an attacker to run software on the victim's machine:

1. Victim authenticates with SSO on their machine.

2. Attacker runs software on the victim's machine and intercepts the SSO token.

3. Attacker then uses the SSO token to login themselves in on their own machine.

3—A variation of scenario #2 can include requiring an attacker to run software on the victim's machine:

1. Attacker initiates an SSO request on their machine.

2. Attacker then waits for a victim to initiate an SSO request on the victim's machine. Then, the attacker stealthily replaces the victim's login link with the attacker's link.

3. Attacker then intercepts the SSO token on the victim's machine.

4. Attacker the uses the SSO token to login from their own machine.

Figure 5:
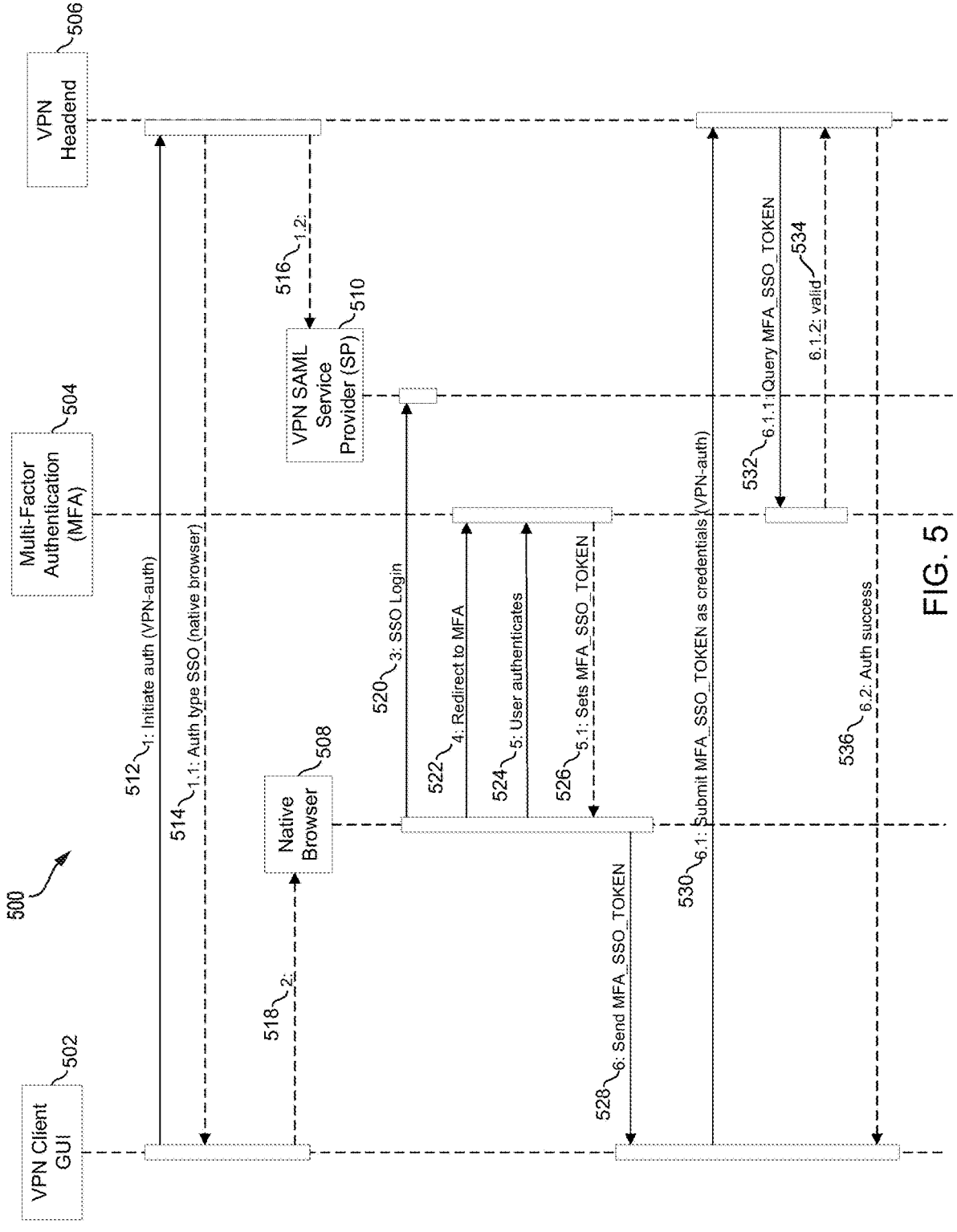
FIG. 5 illustrates an example process for implementing single sign-on, in accordance with some embodiments.

FIG. 5 illustrates an example process for implementing single sign-on 500, in accordance with some embodiments. In some implementations, the process 500 can include utilizing an VPN Client GUI 502, a Multi-Factor Authentication (MFA) (e.g., Cisco DUO) 504, a VPN headend 506, a native browser 508, and a VPN Security Assertion Markup Language (SAML) service provider 510. The process 500 is similar to the process 200 of FIG. 2, with the addition of utilizing the MFA 504.

At step 512, the process 500 can include initiating VPN authentication (e.g., using an VPN-auth protocol) from the VPN Client GUI 502 to the VPN headend 506.

At step 514, the process 500 can include the VPN headend 506 responding with an indication of SSO authentication, which can include providing a login URL, a final login page, and a name of a final login cookie that holds an SSO token.

At step 516, the process 500 can include the VPN SAML service provider 510 receiving an SAML login URL from the VPN headend 506.

At step 518, the process can include the VPN Client GUI 502 generating an embedded web view control (e.g., the native browser 508) and open a login page. The native browser 508 can then listen for navigation events from the web view.

At step 520, the process 500 can include the native browser 508 providing SSO login information to the VPN SAML service provider 510.

At step 522, the process 500 can include redirecting the user to the MFA 504 and authenticating the user.

In some implementations, the process 500 can incorporate the complexities of a native browser and an VPN Client IPC into the MFA 504, if an integration exists between the MFA 504 and the VPN headend 506. For example, the final SSO page can be hosted by the MFA 504, instead of VPN headend service provider 510 (e.g., at step 524 of the process 500).

At steps 526, 528, the process 500 can include the MFA page executing Javascript code to deliver a MFA_SSO_TO-KEN to the VPN Client GUI 502, which can be submitted as credentials to the VPN headend 506 (e.g., at step 530 of the process 500).

At steps 532, 534, 536, the process 500 can include the VPN headend 506 querying the MFA 504 for verification of the validity of the MFA_SSO_TOKEN. Similar security considerations for SSO_TOKEN can also apply to MFA_S-SO_TOKEN.

Having disclosed some example system components and concepts, the disclosure now turns to FIG. 6, which illustrate example method 600 for establishing a cryptographic bind-ing between a browser session and a native application session. The steps outlined herein are exemplary and can be implemented in any combination thereof, including combi-nations that exclude, add, or modify certain steps.

At step 602, the method 600 can include receiving, at a server, information associated with a final single sign-on page from a native browser.

At step 604, the method 600 can include extracting, by the server, a public key from the information associated with the final single sign-on page. The public key can be extracted from an HTTP cookie associated with the final single sign-on page. The encrypting of the single sign-on token can be based on an encryption scheme including at least one of Elliptic Curve Diffie-Hellman (ECDH), Elliptic Curve Inte-grated Encryption Scheme (ECIES), and Hybrid Public Key Encryption (HPKE). The encrypting of the single sign-on token can include encrypting additional metadata associated with the single sign-on token.

At step 606, the method 600 can include generating, by the server, a single sign-on token to bind a browser session and a native application session. The single sign-on token can be a Security Assertion Markup Language authentica-tion token. The browser session can be an external transport layer security browser session and the native application session can be a native application transport layer security session At step 608, the method 600 can include associating, by the server, the single sign-on token with the public key extracted from the information associated with the final single sign-on page.

At step 610, the method 600 can include encrypting, by the server, the single sign-on token with the public key to bind the browser session and the native application session.

The method of 600 can further include determining whether the public key matches an active VPN authentica-tion key.

Figure 7:
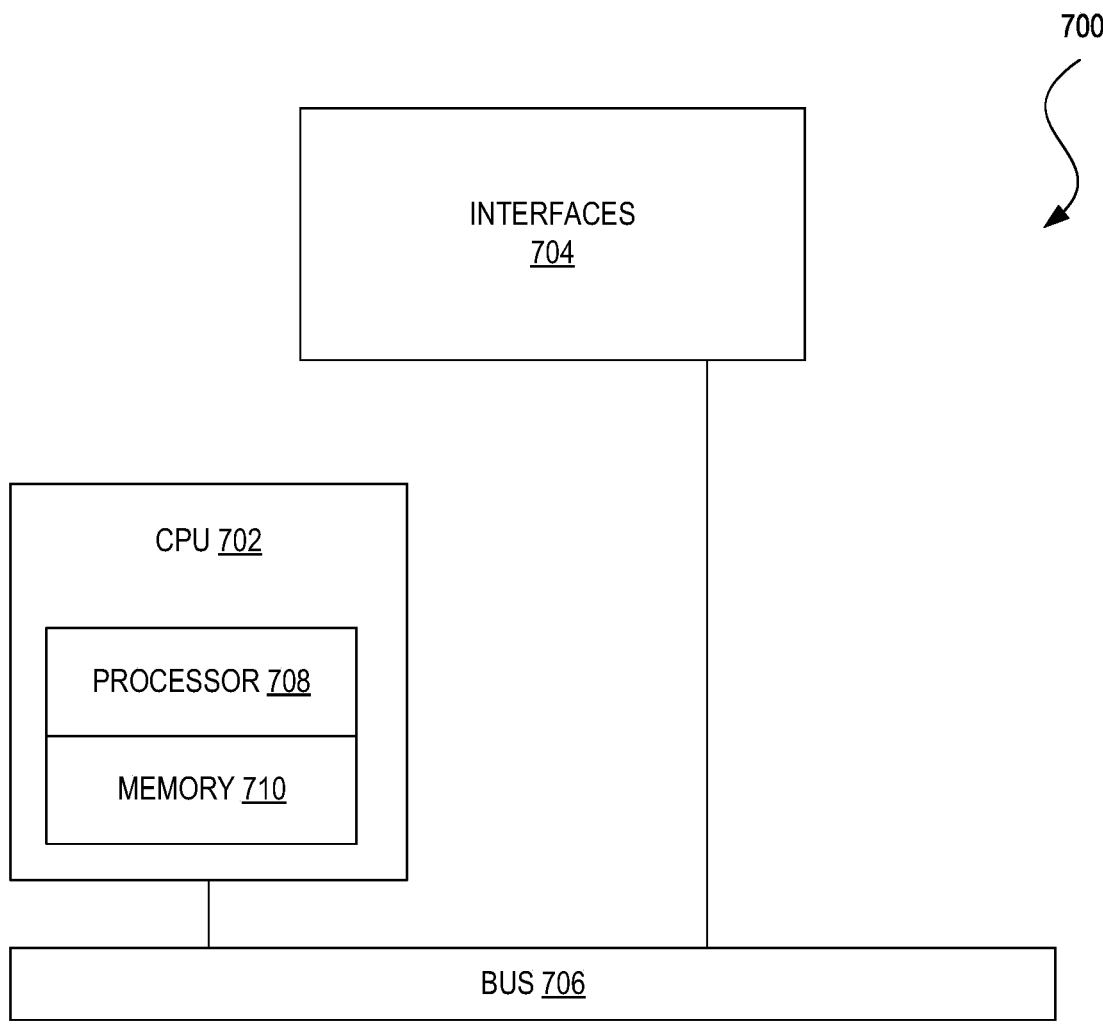
FIG. 7 illustrates an example of a network device, in accordance with some embodiments.

FIG. 7 further illustrates an example of a network device 700 (e.g., switch, router, network appliance, etc.). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing func-tions. The CPU 702 preferably accomplishes all these func-tions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

An enterprise network can address the above and other security requirements with certain enhancements. For example, the enterprise network can create an International Mobile Subscriber Identity (IMSI) whitelist in in an Authen-tication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authenti-cation system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communi-cation intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8A:
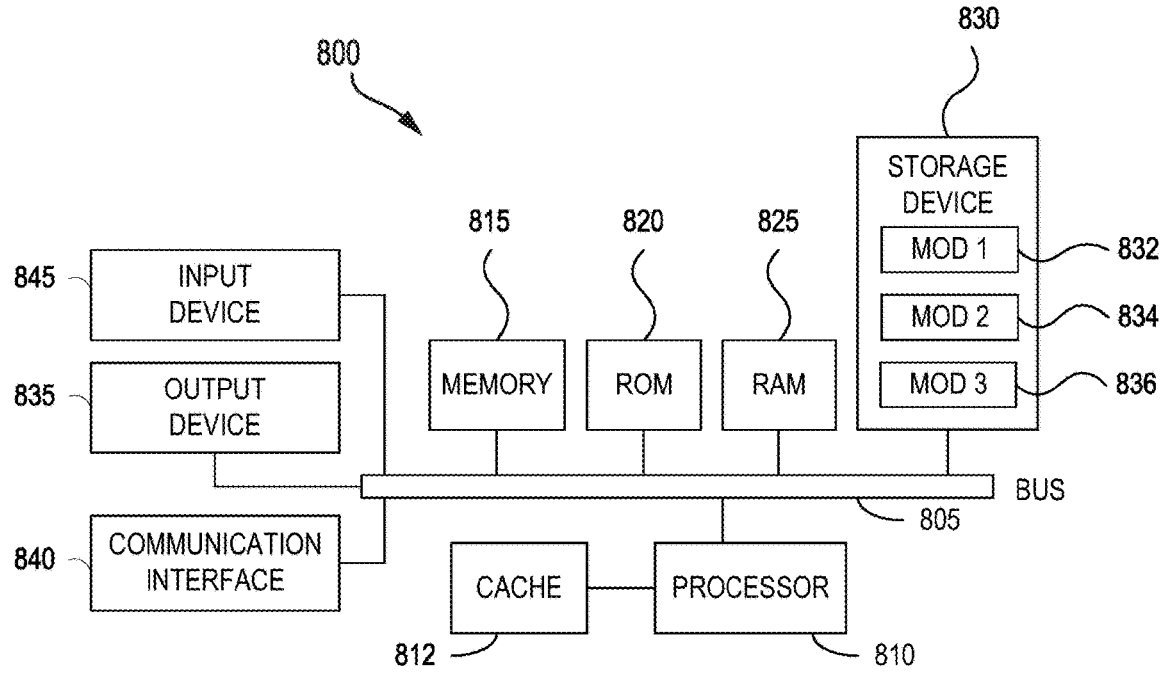
FIGS. 8A and 8B illustrate examples of systems, in accordance with some embodiments.
Figure 8B:
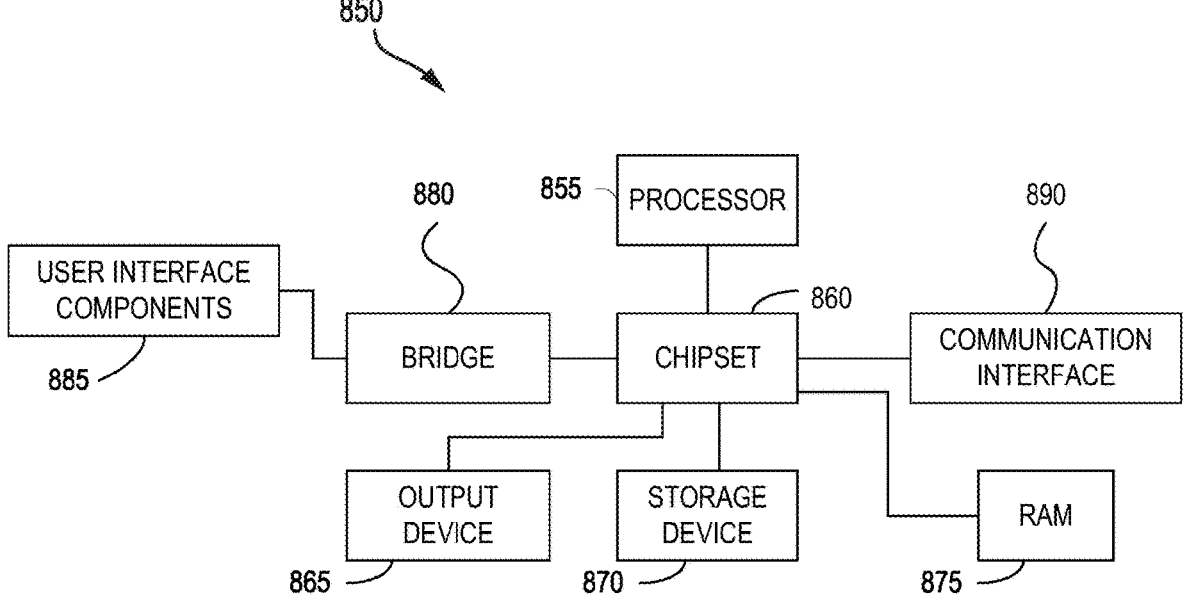

FIGS. 8A and 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, at a server, information associated with a final single sign-on page from a native browser;
extracting, by the server, a public key from the information associated with the final single sign-on page from an identifier associated with the final single sign-on page;
determining whether the public key matches an active authentication key of a secure access system;
generating, by the server, a single sign-on token to bind a browser session and a native application session upon determining that the public key matches the active authentication key of the secure access system;
associating, by the server, the single sign-on token with the public key extracted from the information associated with the final single sign-on page; and
encrypting, by the server, the single sign-on token with the public key to bind the browser session and the native application session, wherein the encrypting of the single sign-on token includes encrypting additional metadata associated with the single sign-on token.

2. The computer-implemented method of claim 1, wherein the secure access system is a Virtual Private Network (VPN).

3. The computer-implemented method of claim 2, wherein the active authentication key is a VPN authentication key.

4. The computer-implemented method of claim 1, wherein the single sign-on token is a Security Assertion Markup Language authentication token.

5. The computer-implemented method of claim 1, wherein the browser session is an external transport layer security browser session and the native application session is a native application transport layer security session.

6. The computer-implemented method of claim 1, wherein the encrypting of the single sign-on token is based on an encryption scheme including at least one of Elliptic Curve Diffie-Hellman (ECDH), Elliptic Curve Integrated Encryption Scheme (ECIES), and Hybrid Public Key Encryption (HPKE).

7. A system comprising:
one or more processors; and
at least one computer-readable storage medium having stored therein instructions which, when executed by the one or more processors, cause the system to:
receive information associated with a final single sign-on page from a native browser;
extract a public key from the information associated with the final single sign-on page from an identifier associated with the final single sign-on page;
determine whether the public key matches an active authentication key of a secure access system;
generate a single sign-on token to bind a browser session and a native application session upon determining that the public key matches the active authentication key of the secure access system;
associate the single sign-on token with the public key extracted from the information associated with the final single sign-on page; and
encrypt the single sign-on token with the public key to bind the browser session and the native application session, wherein encrypting the single sign-on token includes encrypting additional metadata associated with the single sign-on token.

8. The system of claim 7, wherein the secure access system is a Virtual Private Network (VPN).

9. The system of claim 8, wherein the active authentication key is a VPN authentication key.

10. The system of claim 7, wherein the single sign-on token is a Security Assertion Markup Language authentication token.

11. The system of claim 7, wherein the browser session is an external transport layer security browser session and the native application session is a native application transport layer security session.

12. The system of claim 7, wherein the encrypting of the single sign-on token is based on an encryption scheme including at least one of Elliptic Curve Diffie-Hellman (ECDH), Elliptic Curve Integrated Encryption Scheme (ECIES), and Hybrid Public Key Encryption (HPKE).

13. A non-transitory computer-readable storage medium comprising:
instructions stored on the non-transitory computer-readable storage medium, the instructions, when executed by one or more processors, cause the one or more processors to:

receive information associated with a final single sign-on page from a native browser;

extract a public key from the information associated with the final single sign-on page from an identifier associated with the final single sign-on page;

determine whether the public key matches an active authentication key of a secure access system;

generate a single sign-on token to bind a browser session and a native application session upon determining that the public key matches the active authentication key of the secure access system;

associate the single sign-on token with the public key extracted from the information associated with the final single sign-on page; and encrypt the single sign-on token with the public key to bind the browser session and the native application session, wherein encrypting the single sign-on token includes encrypting additional metadata associated with the single sign-on token.

14. The non-transitory computer-readable storage medium of claim 13, wherein the secure access system is a Virtual Private Network (VPN).

15. The non-transitory computer-readable storage medium of claim 14, wherein the active authentication key is a VPN authentication key.

16. The non-transitory computer-readable storage medium of claim 13, wherein the single sign-on token is a Security Assertion Markup Language authentication token.

17. The non-transitory computer-readable storage medium of claim 13, wherein the browser session is an external transport layer security browser session and the native application session is a native application transport layer security session.

* * * * *